March 16, 1943.  J. F. O'BRIEN  2,313,960
ELECTRICAL WIRING SYSTEM
Filed Sept. 13, 1940  2 Sheets-Sheet 1

INVENTOR
Joseph F. O'Brien
BY
HIS ATTORNEY

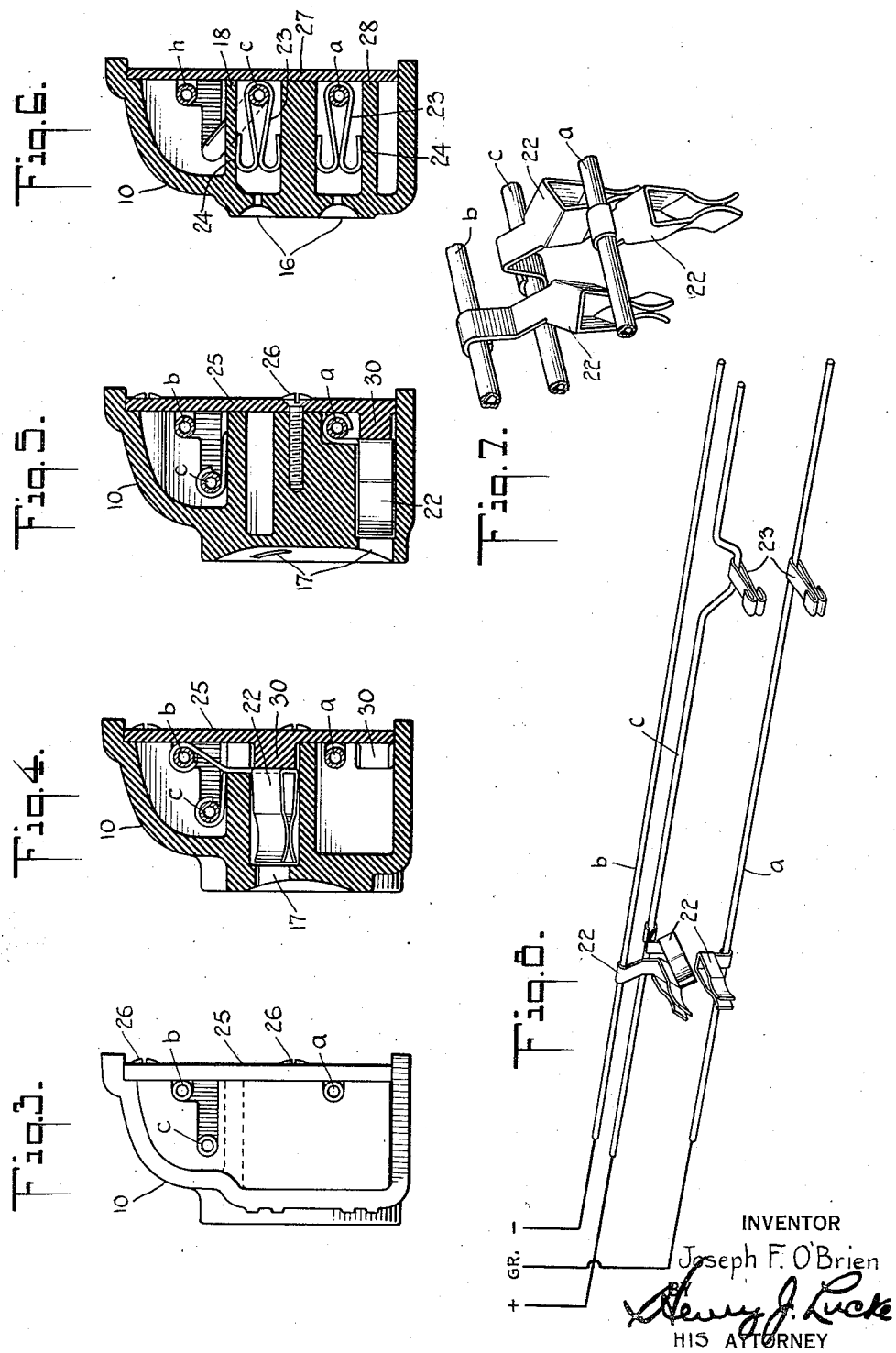

Patented Mar. 16, 1943

2,313,960

UNITED STATES PATENT OFFICE 2,313,960

ELECTRICAL WIRING SYSTEM

Joseph F. O'Brien, Jersey City, N. J., assignor to John B. Pierce Foundation, New York, N. Y., a corporation of New York Application September 13, 1940, Serial No. 356,582

5 Claims. (Cl. 173—334.1)

This invention relates to improved wiring systems.

In particular, the invention relates to an electricity conductor unit arranged for seriatim electrical and mechanical interconnection with like conductor units to form a three-wire electrical distribution system from which 220 volt or 110 volt electric power may be supplied to electrical accessories.

It is an object of the invention to provide an electricity conductor unit adapted for seriatim electrical interconnection with other conductor units and connectible to a three-wire, 220 volt electric power source, to provide for a take-off of either 110 volts or 220 volts for electrical appliances.

It is an object of the invention to provide an improved electrical conductor unit adaptable to be run at the base board of a kitchen, for example, and providing means whereby 220 volt electricity may be made available for an electric range, water heater, or other heavy duty device, and 110 volt electricity may be made available for toasters, electric clocks, or like conventional household appliances.

According to the present invention, the electricity conductor unit comprises a substantially hollow body of electrical insulation material suitably configurated to render it adaptable for use as a structural molding or other decorative trim. The body is preferably formed with male and female end portions so that contiguous conductor units may be mechanically interconnected with "broken" joints to afford full protection of the electrical conductors against accidental short circuit.

Within the said substantially hollow body are a plurality, preferably three, of electricity conductors, extending transversely through the body and in standardized positioning at the ends thereof, so that the electricity conductors of adjacent units will be in uniform registry. The three conductors are adapted to be connected, respectively, to the "hot," "return" and "ground" wires of a standard three-wire 220 volt wiring system.

Desirably, the electricity conductor units are formed in sixteen inch lengths or any multiple thereof, to afford securement of the units to wall studding placed on conventional sixteen inch centers. Within said hollow body, and in electrical connection with the conductors thereof, contact means provide for connection with the blades of an electrical adjustment plug. Said contact means, according to a preferred form of the invention are arranged in groups; one group is in electrical connection with all of the three conductors within the body and provides, therefore, the high voltage connection. A second of the groups of contact means may be connected to the hot conductor and the ground conductor of the stated three conductors, thereby affording means by which 110 volt electric current may be tapped from the conductor unit.

In conformity with standard practice, the 220 volt connection is so arranged that no standard 110 volt attachment plug may be used with it; accordingly, a series of interconnected units may be carried beyond the location of the electric range or other heavy-duty device without fear of accidentally plugging a 110 volt appliance into the 220 volt outlet.

Other features and advantages will hereinafter appear.

In the drawings:

Fig. 3 is an end view of the unit.

Fig. 4 is a section taken through the contact means at the power take-off point, on lines 4—4 of Fig. 2.

Fig. 5 is a section taken on lines 5—5 of Fig. 2.

Fig. 6 is a section taken through the contact means at the service take-off point, on lines 6—6 of Fig. 2.

Fig. 7 is a perspective of the power take-off contacts and arrangement thereof.

Fig. 8 is a schematic wiring diagram of an electric circuit embodying the invention.

Figure 1:
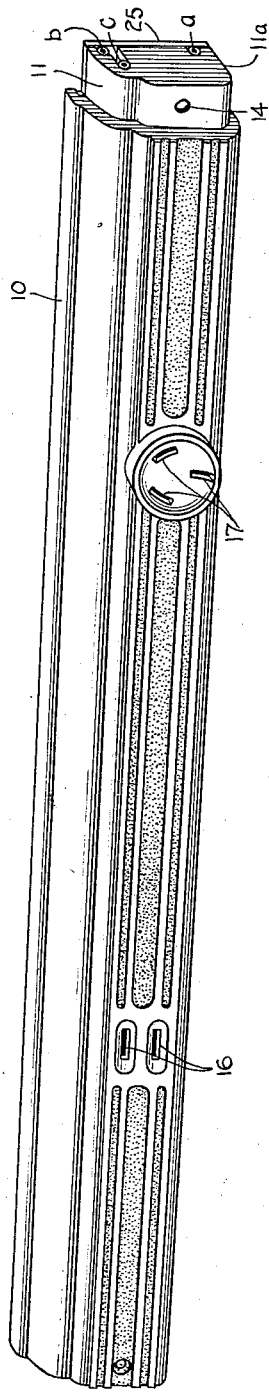
Fig. 1 is a perspective of an electricity conductor unit embodying the present invention.

Referring to the drawings, Fig. 1 is a perspective of an electricity conductor unit formed pursuant to the present invention. The unit comprises a substantially hollow housing 10, suitably configurated and decoratively treated to render the same adaptable for use as a building molding or the like. The housing is provided with a male extension end 11 and a female socket end 12, see Fig. 2, the male end of one unit interfitting with the female socket of an adjacent unit to afford a broken joint protecting the conductors against accidental short circuit. An aperture 14 in the male end is arranged to register with an aperture 15 in the female end; through the registering apertures a wood screw or like fastening device may be passed to mutually secure contiguous conductors and to secure the same to a wall or studding of the building.

The face of the conductor unit is provided with a plurality, desirably two, of plug attachment groups. One of said groups may have a pair of apertures 16 arranged in parallelism to accommodate the parallel blades of a conventional 110 volt attachment plug. The second of said groups desirably has a trio of angularly related apertures 17 for accommodation of a conventional 220 volt fixture plug.

Figure 2:
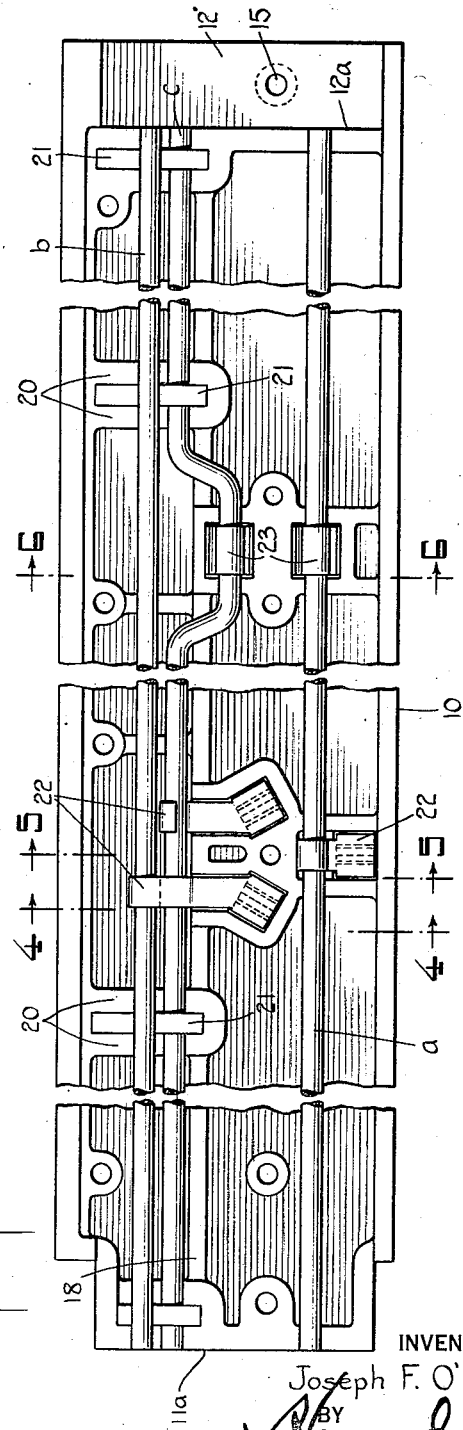
Fig. 2 is a rear view of the unit of Fig. 1, enlarged and foreshortened, and with the rear closure plate removed to reveal the arrangement of contact means.

Referring now to Fig. 2, the substantially hollow body 10 is formed with a longitudinally extending wall 18 and a suitable plurality of transverse walls, of which walls 20, for example, afford pocket means wherein suitable insulating electrical spacer means 21 may be positioned.

Other transverse wall structures are suitably arranged to provide insulating pockets within which the electric contact means are insulatedly mounted as presently described.

Within said body, and extending longitudinally thereof in mutually spaced and insulated relationship are a plurality of electricity conductors, desirably tubular to provide for interconnection with electricity conductors of like interconnected units through the agency of electrical conducted pins frictionally inserted in the respective tubular conductors. Said conductors include a conductor a, which as shown in Fig. 8 is electrically connected to the ground wire of the three-wire electric system, a conductor b connected to the return wire of said three-wire system, and a conductor c to the hot wire of said system.

The conductors a, b and c are uniformly positioned within the body of the units and terminate at the effective ends of the unit according to a standardized arrangement whereby each conductor of one unit is in registry with a like conductor of a contiguous unit. By "effective ends of the unit," is meant the end wall 11a at the male end of the body, and the wall 12a defining the base of the female socket end of the unit.

It will be noted from Fig. 2 that a trio of electric contact means, 22, 22, 22, are connected to the respective conductors a, b and c. The contacts of this group are suitably arranged in registry beneath the openings 17 of the body, to receive and contact the blades of an attachment plug adaptable for 220 volt service. A perspective of such contacts 22, 22, 22, and their respective conductors is shown in Fig. 7.

A second group of contact means, adapted for 110 volt service, includes a pair of contacts 23, in electrical connection with ground conductor a and hot conductor c. Said contacts 23, 23 are in registry with the openings 16 in the housing; accordingly conductor c is suitably offset in the zone of the said openings, as shown in Figs. 2 and 6.

Conductors a and b are run at the base of the housing, and the various transverse walls of the housing are notched (see Fig. 3) to accommodate the said conductors. Conductor c is run adjacent the face of the housing; suitable notches in the transverse walls and in the spacer means 21 secure said conductor c in operative position.

A backing strip 25 of insulation material, is secured to housing 10 as by machine screws 26 cooperating with suitably tapped bases formed in the housing.

In Fig. 6, it is seen that the contacts 23, 23 are arranged adjacent the base of the unit. Said contacts are supported against displacement by the engagement of side wing members 24 thereof with the illustrated longitudinal walls 18, 27, 28.

In Figs. 4 and 5 it will be noted that contacts 22, 22, 22, of the power take off group are positioned above the base of the unit, and to that end the backing strip 25 is provided with suitable shoulders 30, which serve as bases for the support of the said contacts 22.

Whereas I have described my invention by reference to specific forms thereof, it will be understood that many changes and modifications may be made without departing from the spirit of the invention.

I claim:

1. An electricity conductor unit, comprising a substantially hollow body of electrical insulation material, a plurality of transverse wall means therein, a plurality of electricity conductors arranged within said body and extending longitudinally to terminate in fixed standardized relationship at the effective ends of the body, said electricity conductors being relatively loosely supported on said wall means, electric contact means arranged within said body and in electric connection with each of three of said conductors, said contact means being in offset relationship to said conductors, electric contact means arranged within said unit remote from said first-mentioned contact means and in electric connection with two of the conductors of the unit, backing means for said unit arranged to maintain said conductors in operative association therein, and shoulder means on said backing means and arranged in operative association with said offset contact means to serve to support said contact means and therewith associated conductors against rotation.

2. An electricity conductor unit, comprising a substantially hollow body of electrical insulation material, transverse wall means disposed within said body, a plurality of electricity conductors of substantially circular cross section arranged within said body and extending longitudinally to terminate in fixed standardized relationship at the effective ends of the body, said conductors passing through said wall means for relatively loose support thereby, one of said electricity conductors disposed at a level above that of the remaining conductors, electric contact means arranged within said body and in electric connection with each of three of said conductors, said contact means being offset with respect to said electricity conductors and elevated above the base of the unit, electric contact means arranged within said unit remote from said first-mentioned contact means and in electric connection with two of the conductors of the unit, removable backing means for said unit arranged to maintain said conductors in operative association therein, and shoulder means on said backing means and arranged in operative association with said first-mentioned contact means to serve to support said contact means and therewith associated conductors against rotation.

3. An electricity conductor unit, comprising a substantially hollow body of electrical insulation material configurated to simulate building molding and having a frontal wall having a longitudinal flat surface, a bottom wall extending substantially perpendicularly rearwardly therefrom and an upper wall curving upwardly and rearwardly from said frontal wall, said frontal wall being imperforate except for a plurality of groups of attachment plug receiving apertures arranged therein; a wall of electrical insulation material disposed internally of said hollow body extending longitudinally thereof and defining a plurality of chambers within said body, transverse walls of electrical insulation material extending from said longitudinal wall to said upper wall, said transverse walls having notches to receive and position electricity conductors; transverse walls of electrical insulation material extending from said longitudinal wall to said bottom wall and having notches to receive and position electricity conductors; a plurality of electricity conductors extending longitudinally of said hollow body and arranged on said first-mentioned transverse walls at different levels in mutually spaced insulated relationship with each other; an electricity conductor extending longitudinally of said hollow body and arranged on said second-mentioned transverse walls in the plane of one of said first-mentioned conductors; one of said first-mentioned conductors being offset in the zone of one of said groups of plug receiving apertures to come into adjacency with said second-mentioned conductor; electric contact means attached to each of said total plurality of electricity conductors and arranged in registry with one group of apertures; electric contact means attached to said offset conductor and to said second-mentioned conductor and arranged in registry with another group of apertures; and backing means for closing said hollow body and for retaining said conductor means therein.

4. An electricity conductor unit, comprising a substantially hollow body of electrical insulation material configurated to simulate building molding and having a frontal wall having a longitudinal flat surface, a bottom wall extending substantially perpendicularly rearwardly therefrom and an upper wall curving upwardly and rearwardly from said frontal wall, said frontal wall being imperforate except for a plurality of groups of attachment plug receiving apertures arranged therein; a longitudinally extending wall internally of said hollow body and defining a plurality of chambers within said body, transverse walls of electrical insulation material extending from said longitudinal wall to said upper wall, said transverse walls having notches to receive and position electricity conductors; transverse walls of electrical insulation material extending from said longitudinal wall to said bottom wall and having notches to receive and position electricity conductors; a plurality of electricity conductors extending longitudinally of said hollow body and arranged on said first-mentioned transverse walls at different levels in mutually spaced insulated relationship with each other; an electricity conductor extending longitudinally of said hollow body and arranged on said second-mentioned transverse walls in the plane of one of said first-mentioned conductors; one of said first-mentioned conductors being offset in the zone of one of said groups of plug receiving apertures to come into adjacency with said second-mentioned conductor; electric contact means attached to each of said total plurality of electricity conductors and arranged in registry with one group of apertures; electric contact means attached to said offset conductor and to said second-mentioned conductor and arranged in registry with another group of apertures; spacer means of electrical insulation material cooperating with certain of said transverse walls to hold said conductor means thereon; and backing means for closing said hollow body and for retaining said spacer means and said conductor means therein.

5. An electricity conductor unit comprising a substantially hollow body of electrical insulation material having a flat front wall coextensive with the length of the unit but of a width less than the maximum width of the unit, a bottom wall extending substantially perpendicularly rearwardly from said front wall, and an upper wall extending angularly rearwardly from said front wall, said front wall being imperforate except for a plurality of groups of attachment plug receiving apertures therein; a wall of electrical insulation material disposed internally of said hollow body extending longitudinally thereof at substantially the juncture of said front wall and said upper wall to provide a longitudinally extending chamber remote from said groups of apertures; a pair of electricity conductors arranged within said chamber in fixed mutually spaced relationship; an electricity conductor within said hollow body beneath said front wall; electric contact means on said conductor in registry with one aperture of each of said group of apertures; electric contact means on each of the two other electricity conductors brought through said longitudinal wall to register with the remaining apertures of one of said groups of apertures; and one of said two other electricity conductors brought through said longitudinal wall and provided with electric contact means in registry with a second aperture of another of said groups of apertures, whereby electrical connection may be made with all of said conductors within the unit or two conductors thereof.

JOSEPH F. O'BRIEN.